United States Patent [19]

Chew et al.

[11] 4,354,128
[45] Oct. 12, 1982

[54] DYNAMO ELECTRIC MACHINE BRUSH ASSEMBLY

[75] Inventors: Anthony J. Chew, Stirchley; Graham M. Leeder, Sutton Coldfield; Thomas W. Pickford, Walsall, all of England

[73] Assignee: Lucas Industries Limited, Birmingham, England

[21] Appl. No.: 172,217

[22] Filed: Jul. 25, 1980

[30] Foreign Application Priority Data

Aug. 10, 1979 [GB] United Kingdom ............... 7927909

[51] Int. Cl.³ .......................................... H01R 39/38
[52] U.S. Cl. ................................... 310/242; 310/247; 310/248
[58] Field of Search ............... 310/242, 245, 246, 249, 310/239, 248

[56] References Cited

U.S. PATENT DOCUMENTS

| 2,194,620 | 3/1940 | Sekyra | 310/247 |
| 2,206,366 | 7/1940 | Redmond | 310/247 |
| 3,154,709 | 10/1964 | Ettema et al. | 310/246 |
| 3,510,708 | 5/1970 | O'Connor | 310/242 |
| 3,656,018 | 4/1972 | Maher | 310/242 |
| 3,955,113 | 5/1976 | Hillyer et al. | 310/245 |

Primary Examiner—Donovan F. Duggan
Attorney, Agent, or Firm—Trexler, Bushnell & Wolters, Ltd.

[57] ABSTRACT

A brush assembly comprising an electrically insulating plate having therein an aperture with which communicate first and second slots. The slots each slidably receive a brush and a compression spring acts between the closed end of each of the slots and the respective brush to urge the brush slidably towards the aperture. The brushes and at least one wall of each of the slots are provided with mating surfaces whereby the brush may be latched in a retracted position relative to its respective slot against the action of its respective compression spring.

11 Claims, 7 Drawing Figures

DYNAMO ELECTRIC MACHINE BRUSH ASSEMBLY

This invention relates to a brush assembly for a dynamo electric machine.

We have previously proposed a brush assembly wherein the brushes are supported on an electrically insulating plate having therein a centrally disposed aperture within which the commutator of the dynamo electric machine lies in use, the plate being formed with a pair of generally radially extending slots extending outwardly from the central aperture. A brush is slidably engaged in each of said slots, and has extending along the length of a pair of opposite sides, a groove within which an edge of the slot is received slidably to mount the brushes on the plate. Thus the brushes are guided by the slots for movement towards and away from the commutator in use, and a spring acts between each brush and the closed end of the respective slot in the plate to urge the brush into contact with the commutator in use.

A problem encountered with brush assemblies of the previously proposed type is that the brushes are assembled into their respective slots prior to assembly of the plate into the dynamo electric machine. Thus some mechanism must be provided for holding the brushes substantially wholly within their respective slots against the action of their respective compression springs to enable the commutator of the dynamo electric machine to be inserted through the central aperture of the plate. Clearly if the brushes are not retracted into their slots there exists the possibility of damage occuring to the brushes and possibly to the commutator during engagement of the plate over the commutator. Moreover, it will be recognized that manually holding the brushes in a retracted position and at the same time manipulating the assembly over the commutator of the machine is a particularly skilled and time consuming task, even more so where the plate has three brushes and slots as is sometimes the case. It has previously been proposed to minimize this problem by the use of a separate clip which holds the brushes within their slots against the action of the respective springs, and which is removed after the plate has been assembled over the commutator of the dynamo electric machine. However, the use of such a separate clip itself presents problems in that the clip can damage the brushes, and apart from being an additional component entailing additional expense, the removal of the clip at the appropriate time can prove problematic. For example, it is not unknown for clips to become detached during the assembly sequence, and to drop into the interior of the dynamo electric machine.

It is an object of the present invention to provide a brush assembly wherein the aforementioned problems are minimized.

A brush assembly in accordance with the present invention comprises an electrically insulating plate having therein an aperture within which, in use, the commutator of an associated dynamo electric machine rotates, first and second closed ended slots in the plate, said slots communicating at their open end with said aperture, and extending outwardly from said aperture, first and second brushes slidably received in said first and second slots respectively, and first and second compression springs urging said first and second brushes along the length of their respective slots towards said aperture, each of said brushes being formed on opposite sides with longitudinally extending grooves within which the edges of said slots are received slidably to mount said brushes in said slots, the plate and each brush having respective surfaces which are interengageable when the brush is retracted against the action of the respective compression spring and tilted relative to the plate so that mutual engagement of the respective surfaces serves to latch the brush in a retracted position such that the brush will not impede the insertion of a commutator into said aperture.

In one embodiment, one wall of each of the slots includes a shoulder which extends transversely relative to the length of the slot and which defines one of said surfaces of the plate, and the slots and/or the brushes are so arranged that said brushes can be tilted with respect to the length of their respective slots to engage said surfaces of the brushes against the respective shoulders.

Said surface of each brush may be the end surface of the brush remote from its respective compression spring or may be a surface intermediate the ends of the brush.

The wall of each slot opposite the wall including the shoulder may be relieved to permit tilting of the brush relative to the length of the slot to engage said surface of the brush with said shoulder.

Preferably said shoulder of each slot is defined by one side of a V-shaped notch in said one wall of the respective slot, and extends at right-angles to the length of the slot, the other side of the notch subtending a small acute angle with the length of the slot.

Preferably said first and second slots are generally diametrically opposite one another with respect to the central aperture, and said shoulders are provided by circumferentially adjacent walls of said first and second slots whereby after installation of the brush assembly in the dynamo electric machine both brushes must be moved in the same direction transverse to the axis of the machine to release them from their respective shoulders.

In another embodiment, a longitudinal side wall of at least one of the grooves in each brush has a notch therein, said notch defining said surface of the brush, and the arrangement is such that the brush has to be tilted laterally with respect to the longitudinal extent of the groove to latch it in the retracted position.

Preferably, each groove of each brush has one of the notches.

The invention further resides in a brush and/or a brush support plate for a brush assembly in accordance with the present invention.

Figure 1:
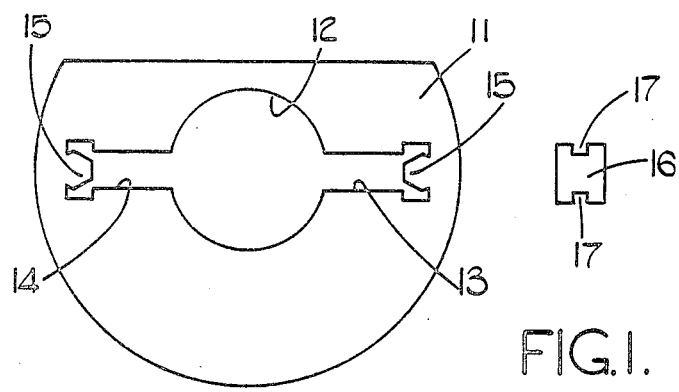
FIG. 1 is a plan view of a brush support plate as previously proposed.

Referring first to FIG. 1 of the drawings the brush assembly includes a brush support plate 11 which is formed from electrically insulating material, and is generally in the form of a circular disc part of which has been removed to leave the disc of D-shape. A circular aperture 12 is formed in the disc, the aperture 12 having its centre coincident with the centre of curvature of the curved periphery of the plate 11. Diametrically opposite one another, and extending radially outwardly from the aperture 12 are first and second linearly extending slots 13, 14 each of which at its inner end communicates with the aperture 12, and at its outer end terminates in an enlarged region containing a projection 15 integral with the plate 11. The projections 15 are undercut, and define spring anchors whereby respective helically wound compression springs are anchored to the plate 11. In FIG. 1, alongside the plate, is shown an end elevational view of a brush 16. The brushes 16 are of conventional composition, and each is of rectangular cross-section having a longitudinally extending groove 17 in a pair of opposite faces thereof. A respective brush is slidably engaged in each of the slots 13, 14 the parts of the plate 11 defining the edges of these slots 13, 14 being slidably received in the grooves 17 of the respective brush. A respective helically wound compression spring anchored at one end to a respective projection 15 urges each brush along the length of its respective slots 13, 14 to project into the aperture 12.

In use, the brush assembly constituted by the plate 11, the brushes 16, and the respective compression springs is positioned within the housing of a dynamo electric machine with the plate 11 at right-angles to the axis of the machine. The commutator of the dynamo electric machine is received within the aperture 12, and the brushes 16 of the slots 13, 14 are urged by their respective compression springs into engagement with the surface of the commutator. Electrical connections are made to the brushes 16 in any convenient manner.

As will be appreciated it is most convenient to assemble the brushes 16 to the plate 11, and then to install the brush assembly into the dynamo electric machine. However, in order to introduce the commutator into the aperture 12 it is necessary to withdraw the brushes 16 against the action of their respective compression springs to permit the commutator to enter the aperture 12 without damaging the brushes.

One example of the present invention will now be described with reference to FIGS. 2 and 3.

Figure 2:
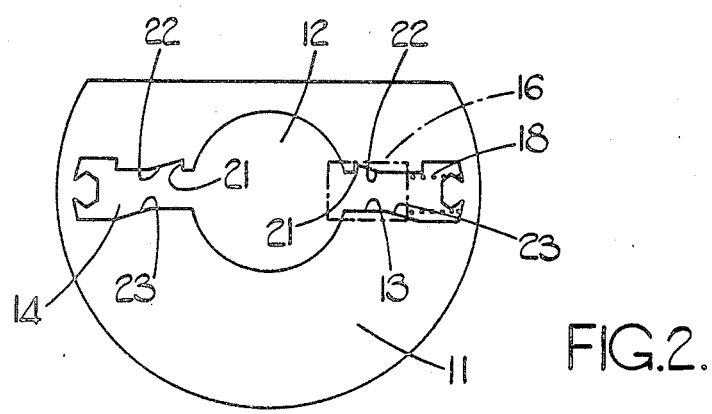
FIG. 2 is a view similar to FIG. 1 of a brush support plate in accordance with one example of the present invention.

It can be seen by comparing FIG. 2 with FIG. 1 that the brush assembly in accordance with one example of the present invention can operate in exactly the same manner as the previously proposed brush arrangement, one brush 16 and its respective compression spring 18 being illustrated in broken lines in the slot 13 of the electrically insulating brush support plate 11. However, it will be noted that the support plate 11 of FIG. 2 differs from the previously proposed support plate shown in FIG. 1 in that one wall of each of the slots 13, 14 is formed, adjacent the aperture 12, with a notch, each notch defining within its respective slot 13, 14 a shoulder 21 extending generally at right-angles to the length of the respective slot. Each notch is generally of V-shape, with the shoulder 21 defined by one side of the notch, and the other side of the notch defining a surface 22 of the wall of the slot which subtends a very small acute angle with the length of the slot. Furthermore, it will be seen that the wall of each slot opposite the notch is provided, at its end remote from the aperture 12, with an inclined surface 23 parallel to the inclined surface 22 of the opposite wall.

It will be apparent therefore that each brush 16 can occupy either of two alternative angular dispositions with respect to its slot. The first angular disposition is where the brush is aligned with the length of its respective slot, and the brush can slide freely along the length of its respective slot. In this disposition of the brush with respect to its slot the brush slides using the parts of the surface of the walls of the slot other than the surfaces 21, 22, 23, as a guide. Thus the surfaces of the walls of the slot parallel to the length of the slot guide the brush for rectilinear sliding movement within its respective slot.

The alternative angular disposition of each brush in its respective slot is that where the brush extends parallel to the surfaces 22, 23, and this angular disposition of the brushes can only be achieved when the brushes are retracted against the action of their respective compression springs to a position such that the end face 24 of each brush remote from its respective compression spring can enter the notch and abut its respective shoulder 21. In this angular disposition therefore a latching effect is obtained wherein each compression spring urges its respective brush against the respective shoulder 21, and the brushes are thus prevented from sliding under the action of their respective compression springs into the aperture 12. It will be recognised that the compression springs 18 can distort sufficiently to permit the second alternative angular disposition of the brushes.

During assembly of a dynamo electric machine, the brush assembly is first constructed, and the sequence is as follows. First and second compression springs 18 are engaged with the respective projections 15 at the ends of the slots 13, 14 and respective brushes 16 are introduced into the respective slots by way of the aperture 12. The brushes at this stage are aligned with the length of their respective slots, and are slid into their slots against the action of the compression springs 18 to such a position that the brushes can be tilted with respect to the length of their respective slots to engage the end surfaces 24 of the brushes in the notches of the slots against the shoulders 21. Upon release of the brushes in this position the brushes remain latched in their retracted condition by the action of their respective compression springs urging the brushes against the shoulders 21. The brush assembly can then be introduced into the dynamo electric machine, and the commutator of the dynamo electric machine can enter the aperture 12 of the plate 11 without being impeded by the brushes. After the plate 11 has been secured in position it is merely necessary to tilt the brushes back into alignment with the length of their respective slots thus disengaging the ends of the brushes from the respective shoulders 21 and permitting the brushes to slide relative to the plate 11 under the action of the compression springs 18 to engage the brushes with the commutator.

It will be appreciated that in many instances access to the interior of the dynamo electric machine, after installation of the brush assembly, may be available from one side only of the machine. For this reason the shoulder 21 of the slot 13 is provided in the wall of the slot 13 which is circumferentially adjacent the wall of the slot 14 containing the shoulder 21. In this way both brushes 16 can be released from their latched condition by movement in the same direction transverse to the dynamo electric machine axis. Clearly if the shoulder 21 were provided in the same wall of each of the two diametrically opposite slots 13, 14 then it would be necessary to move the two brushes in opposite directions relative to the machine to release them from their latched positions.

It will be recognised that in a brush assembly having a third slot for receiving a third brush the third slot can similarly be provided with a notch defining a shoulder 21, and can similarly be relieved on its opposite wall to provide the surface 23, so facilitating similar tilting and latching of the third brush.

It is to be understood that if desired the depth of groove in each brush 16 which receives the wall of the slot opposite that containing the shoulder 21 could be increased at the end of the brush adjacent the spring 18 to facilitate the tilting movement of the brush without necessitating the provision of the relieving of the slot provided by the surface 23. However, such an alternative is not in most cases desirable since the brushes are of a standard form, having standard depth grooves throughout their length and on both opposite faces.

Figure 3:
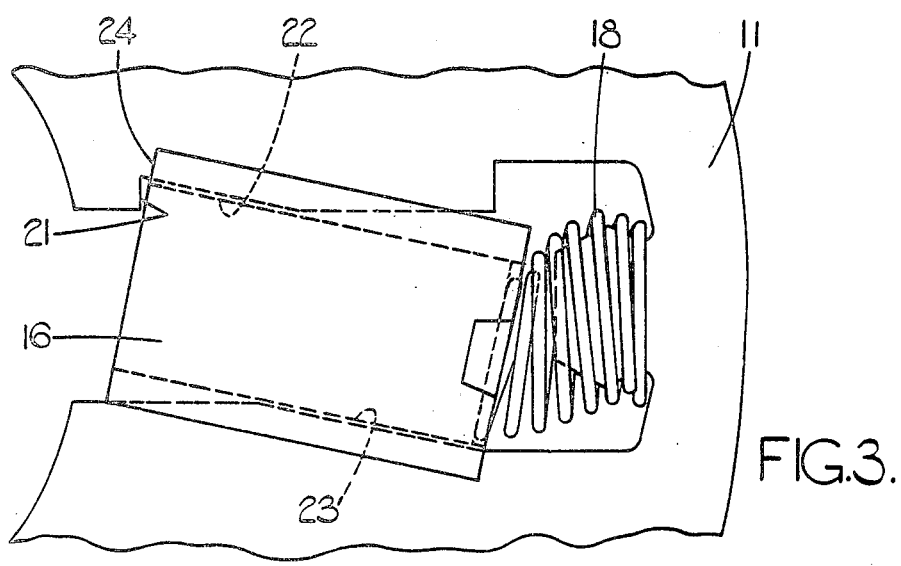
FIG. 3 is an enlarged diagrammatic representation of a brush in its latched position in a slot of the plate shown in FIG. 2.
Figure 4:
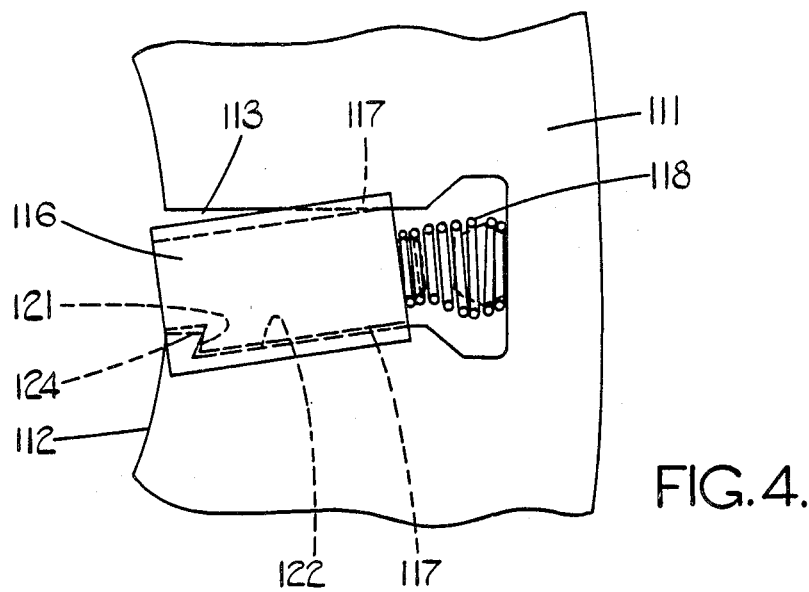
FIG. 4 is a view similar to FIG. 3 of another example of the present invention.

Referring now to FIG. 4, the brush assembly illustrated therein is similar to that of FIG. 3 and similar parts are accorded the same reference numeral prefixed by the numeral 1. In this example, each brush 116 has a notch 124a which extends inwardly from the base of one of the grooves 117 adjacent the end of the brush 116 remote from the spring 118. The notch 124a also opens onto said end of the brush 116, as will be apparent from FIG. 4. The notch 121a which is formed in one wall of slot 113 and which defines shoulder 121, is shaped such that shoulder 121 does not extend generally at right angles to the length of the slot 113 but is angled so to provide a rebate. The notch 124a in the brush 116 is similarly rebated so that a secure dovetail-like engagement is obtained between the shoulder 121 and the surface 124 of the notch 124a engaging therewith when the brush 116 is in its retracted and latched position.

The surface 122 of the slot 113 is linear and extends from the shoulder 121 to the enlarged end region of the slot 113 unlike the surface 22 of the slot 13 in the example of FIG. 3.

As can be seen from FIG. 4, that wall of the slot 113 which is not provided with the notch is completely linear and extends substantially radially relative to the axis of rotation of the commutator. Such a construction permits a better control of sliding movement of the brush 116 in service than is the case with the brush assembly of FIG. 3 where the inclined surface 23 is provided. Because of the provision of the notch 124a which provides the abutment surface 124 intermediate the ends of the brush, it is found that a longer brush can be employed within the same space compared with the brush assembly of FIG. 3.

Figure 5:
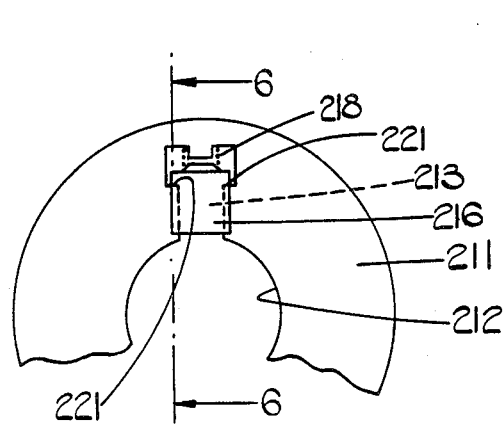
FIG. 5 is a view similar to FIG. 4 of a further example of the present invention.
Figure 6:
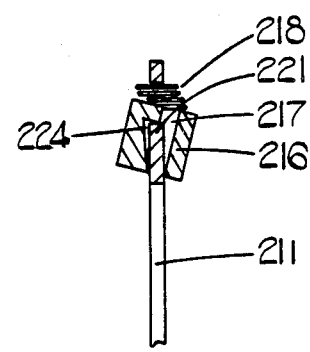
FIG. 6 is a cross-sectional view on the line 6—6 of FIG. 5.
Figure 7:
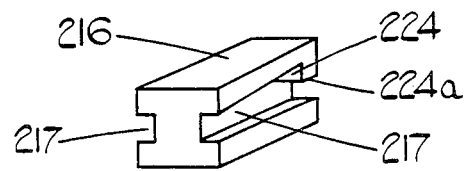
FIG. 7 is a perspective view on a larger scale of the brush used in the example of FIGS. 5 and 6.

Referring now to FIGS. 5 to 7, the brush assembly illustrated therein is similar to that of FIG. 3 and similar parts are accorded the same reference numerals prefixed by the numeral 2. In this example, the walls of slot 213 are linear and mutually parallel from the open end of the slot 213 to the enlarged end region thereof so providing for an even better control of sliding movement of the brushes 216 in service as there is no loss of brush control when the armature of the motor is rotated in either direction. In this example, each groove 217 in the brush 216 has a notch 224a in a longitudinal side wall thereof. The notches 224a in each brush 216 extend in the same direction to provide abutment surfaces 224 which lie adjacent that end of the brush 216 which is engaged by the spring 218. Shoulders 221 are defined by the junctions between the parallel side walls of the slot 213 and the enlarged end region thereof. These shoulders 221 extend substantially at right-angles to the parallel walls of the slot 213. In this example, each brush 216 is held in its retracted position by tilting it laterally with respect to the longitudinal extent of the grooves 217 into the position illustrated in FIG. 6, i.e. by tilting it in the axial direction of the motor to engage shoulders 221 with surfaces 224. Like the example of FIG. 4, the example of FIGS. 5 to 7 permit longer brushes to be employed for a given space compared with the example of FIG. 3. Additionally, the example of FIGS. 5 to 7 has the advantage that the side walls of the slots 213 need no modification (see the slots 13 of FIG. 1).

In the above examples, in the retracted position of the brushes, the brushes do not touch the commutator when fully assembled in the motor. Thus, failure to release a brush will be indicated by non-rotation of the armature, acting therefore as a "faulty assembly" indicator.

In the above description, a brush assembly is employed wherein the brushes extend radially relative to the axis of rotation of the commutator when in their operative positions. However, it is to be appreciated that the invention is also applicable to brush assemblies having brushes of the so-called "trailing" type or the so-called "reaction" type wherein the brushes do not extend precisely radially but are inclined at a slight angle to the radial direction either rearwardly or forwardly thereof relative to the direction of rotation of the commutator.

We claim:

1. A brush assembly comprising a substantially flat electrically insulating plate having therein an aperture within which, in use, the commutator of an associated dynamo electric machine rotates, first and second closed ended slots in the plate, each slot having a pair of longitudinal edges leading into said aperture, said slots each having an open end communicating with said aperture and extending outwardly from said aperture, first and second brushes slidably received in said first and second slots respectively, and first and second compression springs urging said first and second brushes along the length of their respective slots towards said aperture, each of said brushes being formed on opposite sides with longitudinally extending grooves within which the longitudinal edges of said slots are received slidably to mount said brushes in said slots, said plate end each brush having respective surfaces which are interengageable when the brush is retracted against the action of the respective compression spring and tilted relative to the plate so that mutual engagement of said respective surfaces serves to latch the brush in a retracted position such that the brush will not impede the insertion of a commutator into said aperture.

2. A brush assembly as claimed in claim 1 wherein one longitudinal edge of each of the slots includes a shoulder which extends transversely relative to the length of the slot and which defines one of said respective surfaces, and the slots and/or the brushes being so arranged that said brushes can be tilted with respect to the length of their respective slots to engage the surfaces of the brushes against the respective shoulders.

3. A brush assembly as claimed in claim 1 or claim 2, wherein said respective surface of each brush is the end surface of the brush remote from its respective compression spring.

4. A brush assembly as claimed in claim 1 or claim 2, wherein said surface of each brush is a surface intermediate the ends of the brush.

5. A brush assembly as claimed in claim 2, wherein the edge of each slot opposite the edge including the shoulder is relieved to permit tilting of the brush relative to the length of the slot to engage the surface of the brush with the shoulder.

6. A brush assembly as claimed in claim 5, wherein said shoulder of each slot is defined by one side of a V-shaped notch in said one edge of the respective slot, and extends at right-angles to the length of the slot, the other side of the notch subtending a small acute angle with the length of the slot.

7. A brush assembly as claimed in claim 2, wherein said first and second slots are generally diametrically opposite one another with respect to the central aperture and said shoulders are provided by circumferentially adjacent edges of said first and second slots whereby after installation of the brush assembly in the dynamo electric machine both brushes must be moved in the same direction transverse to the axis of the machine to release them from their respective shoulders.

8. A brush assembly as claimed in claim 1 or claim 2, wherein a longitudinal edge of at least one of the grooves in each brush has a notch therein said notch engaging said surface of the brush and the arrangement being such that the brush has to be tilted laterally with respect to the longitudinal extent of the groove to latch it in the retracted position.

9. A brush assembly as claimed in claim 8, wherein each groove of each brush has one of said notches.

10. A brush for use in the brush assembly of a dynamo electric machine, the brush having, in opposite sides thereof, longitudinally extending grooves within which the edges of a respective slot in a brush mounting plate are slidably received, in use, the base wall, or a side wall, of at least one of the grooves being formed with a notch defining a surface of the brush, which surface can, in use, co-operate with a shoulder of the brush mounting plate to hold the brush in a retracted position against the action of a compression spring.

11. A brush mounting plate for use in a brush assembly, the brush mounting plate being substantially flat and having therein first and second slots closed at one end and open at the other end and communicating with an aperture in the plate, said slots extending outwardly from said aperture, for receiving in a slidable manner first and second brushes, one edge of each of said first and second slots being formed with a V-shaped notch defining within the edge a shoulder for co-operating with a surface of the respective brush, to retain the respective brush in a retracted position against the action of a compression spring.

* * * * *